United States Patent [19]

Sewell et al.

[11] 3,916,760

[45] Nov. 4, 1975

[54] AIRCRAFT CARRIED CONSTANT DENSITY MUNITION DISPENSING SYSTEM

[75] Inventors: Clinton J. Sewell, Washington, D.C.; Guy H. Frindell, Columbia; Carl Campagnuolo, Potomac, both of Md.; Paul Vollbracht, Cincinnati, Ohio

[73] Assignee: The United States of America as represented by the Secretary of the Navy, Washington, D.C.

[22] Filed: Jan. 14, 1974

[21] Appl. No.: 433,176

Related U.S. Application Data

[63] Continuation-in-part of Ser. No. 240,415, April 3, 1972, abandoned.

[52] U.S. Cl. ............... 89/1.5 E; 89/1.5 F; 89/1.5 J; 310/25
[51] Int. Cl.² ................................................. B64D 1/06
[58] Field of Search .............. 89/1.5 R, 1.5 J, 1.814, 89/1.5 E, 1.5 F; 310/15, 25

[56] References Cited

UNITED STATES PATENTS

| 2,428,581 | 10/1947 | Peterson | 89/1.5 J |
| 3,712,170 | 1/1973 | Campagnvolo et al. | 89/1.814 |

*Primary Examiner*—Stephen C. Bentley
*Attorney, Agent, or Firm*—R. S. Sciascia; J. A. Cooke; F. K. Yee

[57] ABSTRACT

A munition dispensing system responsive to aircraft speed for dropping munitions at a constant ground distance spacing independent of aircraft speed variation. An air-driven generator produces an a.c. voltage linearly proportional to the airspeed. The generator output is converted to a varying d.c. voltage which controls the frequency of an oscillator to produce a series of pulses with frequency linearly proportional to airspeed. These pulses are used to control the dispensing of munition at selectable ground distance spacings which is maintained regardless of airspeed.

12 Claims, 8 Drawing Figures

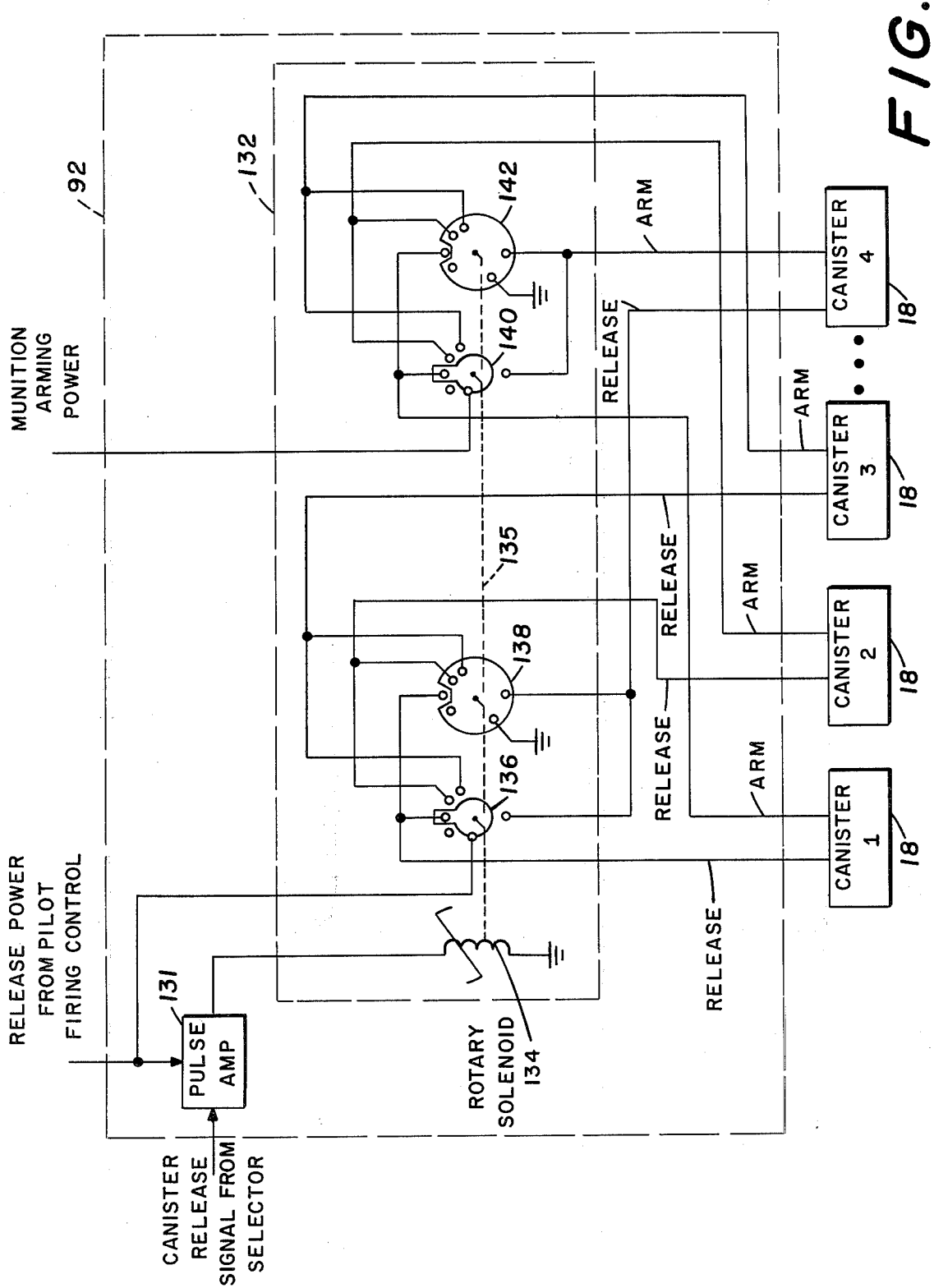

AIRCRAFT CARRIED CONSTANT DENSITY MUNITION DISPENSING SYSTEM

CROSS-REFERENCE TO RELATED APPLICATION

This application is a continuation-in-part of application Serial No. 240,415 filed Apr. 3, 1972 and now abandoned.

BACKGROUND OF THE INVENTION

This invention relates generally to an aircraft carried munition dispensing system and more particularly to a system for dispensing munitions at a constant but selectable ground distant spacings regardless of aircraft speed. The need for such an improved dispenser became a primary concern of the military when more powerful high explosives became available, permitting of smaller packaging. Bombing missions then became much like strafing sorties with a smaller aircraft deploying a large number of smaller bombs rather than dropping "block-buster" bombs. The modern mission generally requires high-speed, low-altitude runs where the pilot must concentrate on flying the aircraft and where it is likely the pilot may miss the intended target with a single, large bomb or a random cluster of bomblets. In such situations a uniform cluster approach, where the target area is saturated with uniformly deployed bomblets, proves to be more effective. However, reliable systems permitting this type of saturation do not exist.

Past attempts at producing uniform ground distance spacing or cluster of bomblets have resulted in systems where the pilot manually controls the dispensing rate or where the pilot actuates an automatic dispenser having a predetermined rate. Obviously, these systems produce erratic results from too large or too small clustering. Furthermore, there were no effective means to produce a constant ground spacing regardless of aircraft speed variations over a target area.

SUMMARY OF THE INVENTION

Accordingly, an object of the present invention is to provide an aircraft munition dispensing system which produces a selectable constant ground spacing of munition.

Another object of the instant invention is to provide an aircraft munition dispensing system which produces a selectable constant ground spacing of munitions regardless of aircraft speed.

A further object of the instant invention is to provide an aircraft munition dispensing system wherein the dispensing rate is linearly proportional to aircraft speed.

Still another object of the present invention is to provide an aircraft munition dispensing system in association with a velocity-discriminating power generator.

A still further object of the instant invention is to provide an aircraft munition dispensing system using a velocity-discriminating, fluidic, environmental sensor, power generator to control the rate of dispensing.

Briefly, these and object of the present invention are attained by the use of a munitions dispensing system wherein a velocity-discriminating power generator controls the rate of dispensing. A fluidic electric generator, placed in the airstream of an aircraft, comprises a water and debris separator attached to a resonance chamber containing a diaphragm connected to a reed positioned in an magnetic field coil. Above a threshold airspeed the diaphragm vibrates at the resonant frequency of the chamber, causing the reed to vibrate, producing a varying magnetic flux pattern in the field coil and thus inducing an electrical current in the coil. The amplitude of vibration, and hence the a.c. voltage, is linearly proportional to airspeed, but at the resonant frequency. The a.c. output is converted to d.c. varying in amplitude linearly according to the airspeed. The d.c. voltage is fed into a variable-frequency, voltage-controlled oscillator to produce pulses which are used to activated ejection means to expel munition canisters at a constant, but selectable, ground spacing.

BRIEF DESCRIPTION OF THE DRAWINGS

A more complete understanding of the invention and many of the attendant advantages thereto will be readily appreciated as the same becomes better understood by reference to the following detailed description when considered in connected with the accompanying drawings wherein:

FIG. 8 is a functional schematic of the canister ejection sequencer.

DESCRIPTION OF THE PREFERRED EMBODIMENT

Figure 1:
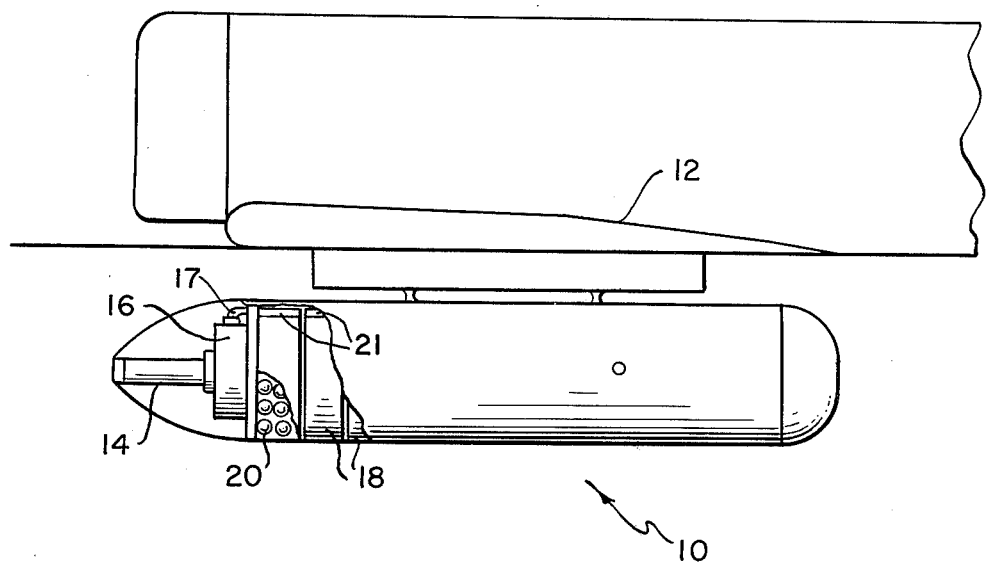
FIG. 1 is a side view, partially cut away, of the aircraft munition dispensing system.

Referring now to the drawings, wherein like reference numerals designate corresponding parts in the several views, there is shown in FIG. 1, generally, a munition dispenser 10 mounted beneath an aircraft 12, such as a helicopter or a fixed wing aircraft. Within the dispenser 10 is contained a fluidic electric generator 14 the output of which is connected to an electronics package 16. Aft of the electronics package 16 and electrically connected thereto by conductors 17 are a plurality of canisters 18, each containing a plurality of bomblets 20. Conductors 17 is turn are connected to a plurality of canister ejectors 21 positioned above each canister 18 and activated to forcibly eject the canisters through the bottom of the dispenser 10 as will be considered more fully hereinbelow.

Figures 2, 3:
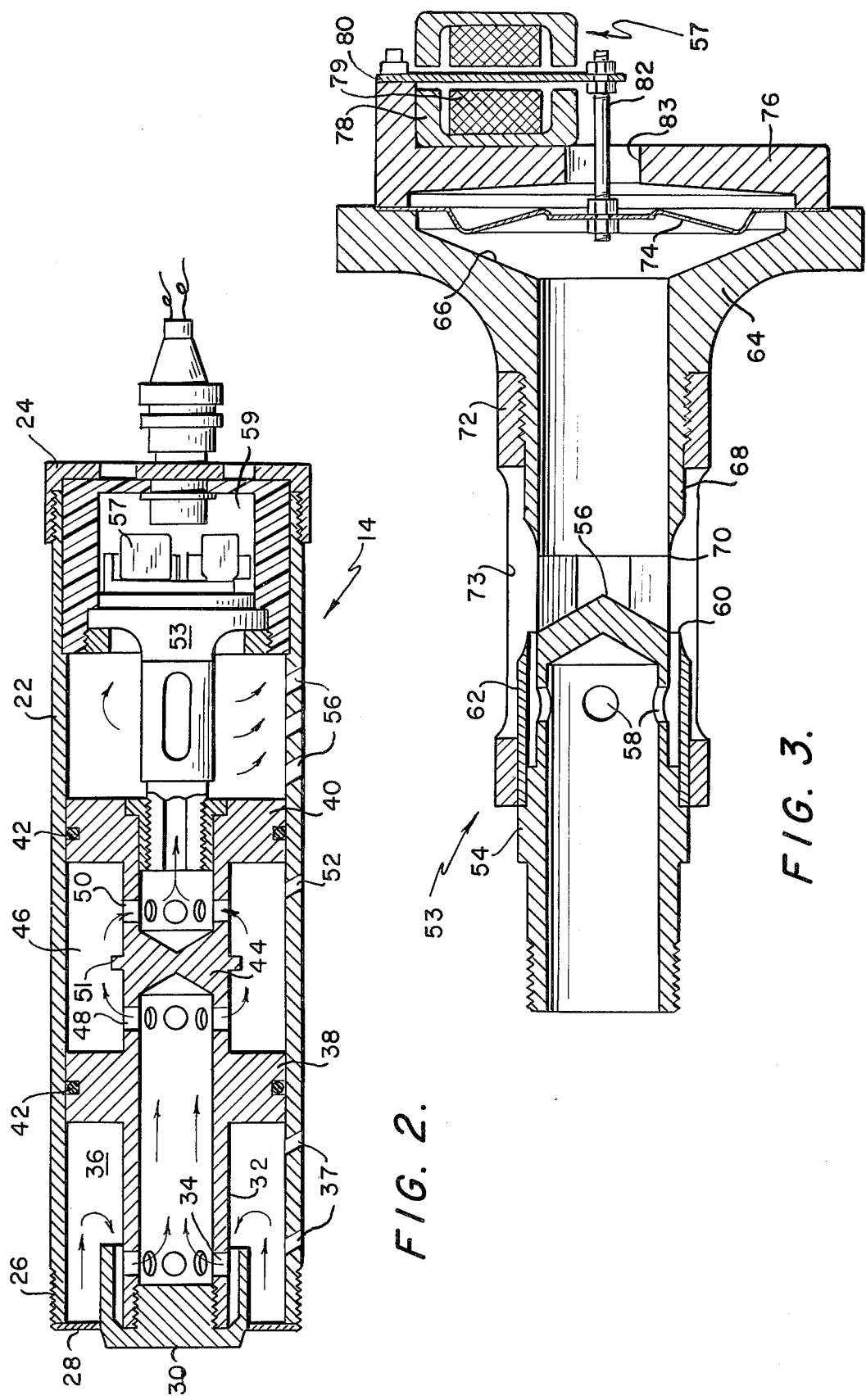
FIG. 2 is a sectioned view of the air cleaner and fluidic generator of electrical energy.
FIG. 3 is a sectional view of the fluidic generator.

Referring now to FIG. 2 the fluidic sensor or air-driven generator 14 has a cylindrical casing 22 closed at the after end by a threaded end cap 24. The forward end of the casing is provided with external threads 26 for mounting the fluidic sensor 14 to the nose of the dispenser 10. A skirt member 30 is coaxial with the mouth of the casing 22 and separated from the walls by a screened port 28. A coaxial tube 32 further supports the skirt 30 and contains a plurality of radial holes 34 under the skirt, and thereby forms an annular chamber 35 between the tube 32 and the casing 22 which functions as a first air cleaning section. A plurality of drain holes 37 penetrate the casing 22 from the chamber 36.

Aft of the chamber 36 and integral with the tube 32 is a spool-shaped member having end flanges 38 and 40 sealed by O-rings 42 and having a spindle 44 therebetween thus forming another annular chamber 46 which functions as a second air-cleaning section. The spindle is bored from the flange ends, leaving a solid portion at the center of the spindle. A plurality of radial holes 48 and 50 are formed in each bored hole to permit communication with the annular chamber 46. A plurality of drain holes 52 (one shown) penetrate the casing 22 to permit removal of water and debris from the second air-cleaning section.

Affixed aft of the spool to flange 40, as by mating threads, is a ringtone pneumatic-to-electrical transducer 53, described in detail hereinafter. Additional detail may be had by reference to "Instruments and Control System," August 1970, pp. 83–85. Reference is made also to U.S. Pat. application Ser. No. 745,949, filed July 17, 1968 by Carl J. Campagnuolo. Mounted on the aft flange of the ringtone transducer or generator is an magnetic coil assembly 57, electrically connected to a voltage-to-frequency converter 59, all enclosed by the casing 22 and the end cap 24 and comprising a portion of the electronics package 16.

Referring now to FIG. 3, the ringtone generator 53 is shown in detail. An elongate inlet tube 54 is closed at its downstream end by a transverse wall 56 causing the airstream to be directed radially outward through a plurality of apertures 58 formed in the wall of inlet tube 54 and thus flow through an annular nozzle 60 defined by a cylindrical nozzle shroud 62 which circumscribes the downstream portion of the inlet tube 54. The ringtone generator further comprises a housing 64 forming a frusto-conical cavity 66 having an elongate cavity inlet 68 with its upstream edge formed as a knife edge orifice 70. The annular nozzle 60 is maintained coaxial with the knife edge 70 by a circumferential sleeve 72 having longitudinal slots 73 formed therein. The divergent end of the frusto-conical cavity 66 is closed by a support block 76. Mounted on the support block is a pair of opposed permanent pole pieces 78 having an electrical coil 79. A flexible, ferromagnetic reed 80 made, for example, of soft iron, is rigidly secured at one end to the support block 76 and extends between the magnetic poles and is connected at its other end to the center of the diaphragm 74 via a shaft 82 extending through an aperture 83 in the support block.

Regarding the operation of this novel fluidic generator 14, it is to be understood that it is affixed to an aircraft, such as a helicopter, in the airstream, facing forward. Referring now to FIG. 2 the ram-pressurized air from the airstream enters the annular screened port 28 and begins a tortuous path by changing direction and entering the radial holes 34 under the skirt member 30. Large debris is screened out and entrained water is deposited in the chamber 36 where any accumulation is expelled through the holes 37. The air now flows downstream inside tube 32 and exits through the radial holes 49 and into the chamber 46. Any entrained water coalesces and is precluded from entering holes 50 by the ring 51 on the spool 44 and is drained through hole 52. The dried air then reenters the spool via holes 50 and is directed downstream to the ringtone transducer 53 via the elongate inlet tube 54.

Referring now to FIG. 3, the air exits tube 54 through the radial ports 58 under the shroud 62 and through the annular nozzle 60. When the airflow through the annular nozzle 60 reaches a predetermined velocity, the air column in the cavity 66 will resonate, oscillating in and out of the cavity as it is alternately compressed and expanded by the influx and efflux of the air over the knife edge orifice 70. The pulsating effect of the resonating air column causes the diaphragm 74 to vibrate at the resonant frequency. This vibration is transmitted via the shaft 82 to the reed 80 causing it to deflect from a normally central position and to oscillate between the magnetic poles 78 to thereby induce alternating magnetic polarities in the reed which induces an a.c. voltage in the coil 79.

The frequency of the induced a.c. voltage is dependent on the resonant frequency of the cavity and diaphragm assembly and is independent of the velocity of the airstream, while the amplitude of the a.c. voltage is porportional to the amplitude of vibration of the diaphragm which is proportional to the velocity of the airstream. The transducer 53 may be tuned to commence resonating at most any air speed by selectively varying the width of annular nozzle 60, the diameter of the cavity inlet 68, the axial distance between knife edge 70 from the nozzle 60, and the compliance of the diaphragm and reed assembly.

Figure 4:
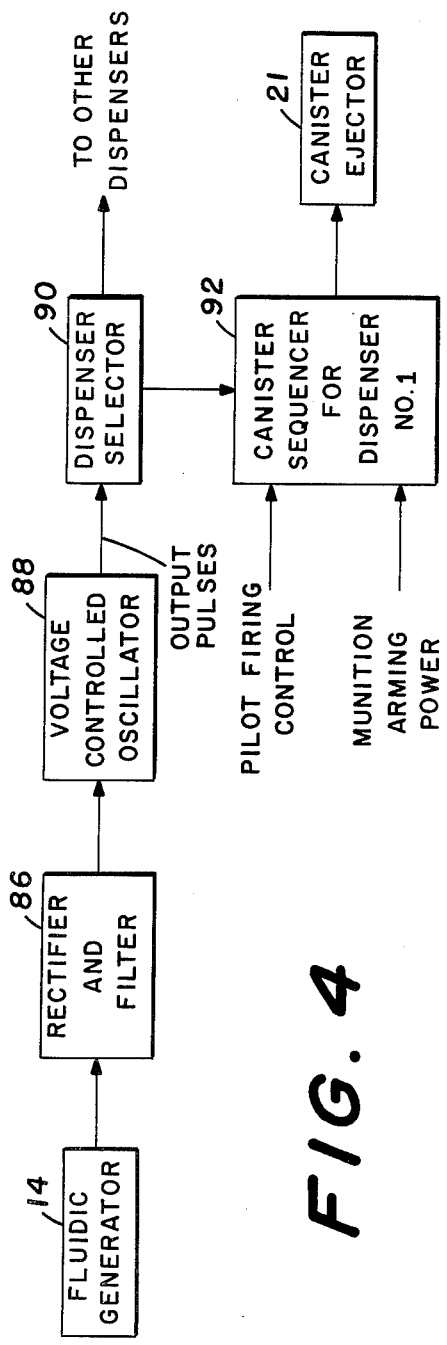
FIG. 4 is a functional block diagram of the munition dispensing system.

FIG. 4 functionally shows the components of the electronics package 16. The a.c. voltage output of the fluidic generator 14, linearly proportional to airspeed, is converted to a d.c. voltage linearly proportional to airspeed in the rectifier section 86 of the voltage-to-frequency converter 59, the rectifier section including a rectifier and filter circuit. The d.c. voltage output of the rectifier section controls the frequency of a voltage-controlled, variable frequency oscillator 88 which produces output pulses with frequency linearly proportional to airspeed. The dispenser selector 90 incorporates the output pulses of oscillator 88 to control the activation of the various dispensers 10 mounted on the aircraft. As is known in the art, a plurality of munition dispensers may be mounted on the weapons mounting points on the aircraft and the contents of these dispensers are alternately and selectively deployed to maintain aircraft weight balance. Each dispenser in turn is provided with a sequencer 92 which regulates the orderly ejection of the canisters 18 from the dispenser by sequentially activating the canister ejectors 21.

Figure 5:
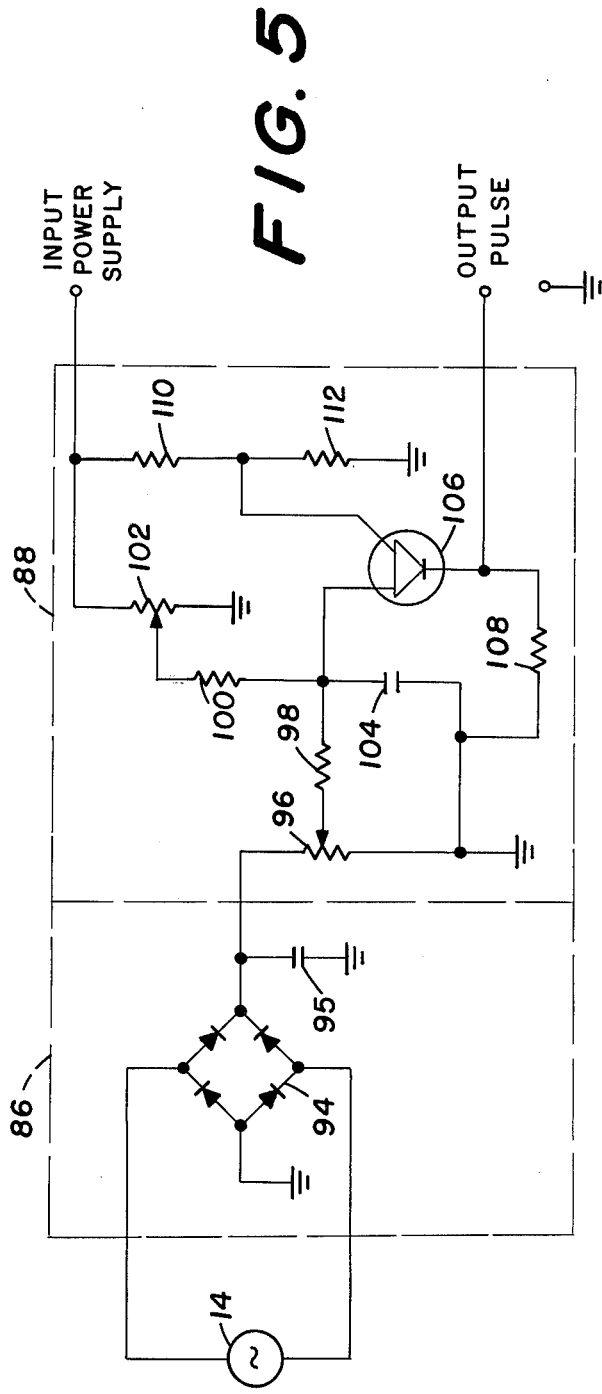
FIG. 5 is a schematic of the rectifier and oscillator circuits.

Shown in FIG. 5 are the circuits of the rectifier section 86 and the voltage-controlled oscillator 88, the rectifier section 86 comprising a solid-state rectifier bridge 94 and filter capacitor 95 to convert the a.c. voltage output of fluidic generator 14 to a d.c. voltage, both voltage outputs being linearly proportional to airspeed. The voltage-controlled oscillator 88 is of the relaxation type wherein power from the aircraft electrical system and fluidic generator are supplied to capacitor 104 through two charging networks, or voltage dividers, consisting of the resistors 96, 98, 100 and 102. When the current causes capacitor 104 to charge to a reference voltage established by the voltage divider 110 and 112, the programmable unijunction transistor (PUT) 106 breaks down, causing capacitor 104 to discharge through resistor 108, producing an output pulse. Following the discharge of capacitor 104, the PUT 106 shuts off and capacitor 104 begins to charge again to repeat the cycle. The resistors 96 and 102 in the charging network function as potentiometers to provide adjustments for the variation of output pulse frequency with airspeed.

Figure 6:
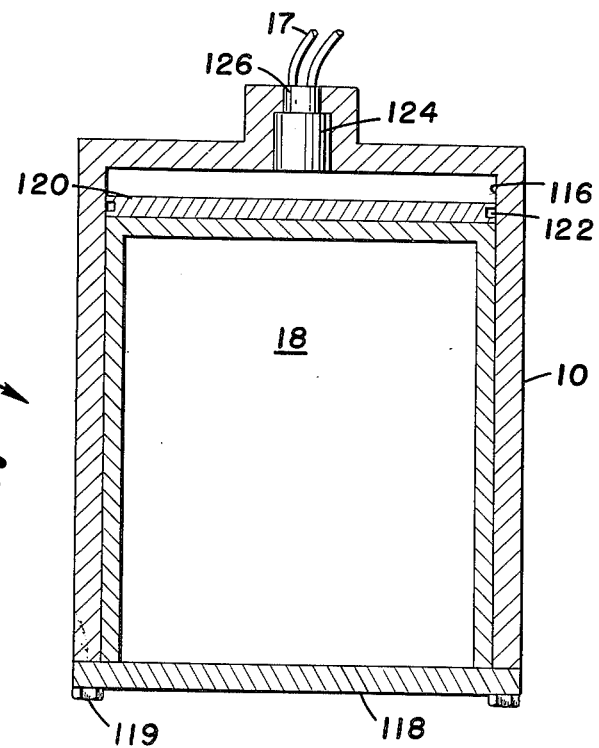
FIG. 6 is a sectioned view of the dispenser showing the canister ejection means.

FIG. 6 illustrates one example of a canister ejector usable with the present dispensing system. Shown is a cross section of one compartment 116 in the dispenser 10. Canister 18 is held in position within the compartment 116 by means of a shearable element 118, such as a shear wire or a shearable strip of metal, the ends being attached to the bottom of dispenser 10 by suitable fastening means 119, such as screws, bolts, rivets, etc. When all of the canisters 18 are in position, the bottoms of these canisters substantially form the lower surface of dispenser 10; the dispenser essentially is an open-bottomed container with the forward portion enclosed to house the generator 14 and the electronic package 16. Abuttingly positioned atop canister 18 is a sealing plate 120, sealed against the sides of compartment 116 by a gasket or O-ring 122, which transmits the force of an explosive cartridge 124 to the canister 18. Conductors 17 carry the output pulse from the sequencer 92 to a firing squib 126 to ignite cartridge 124.

Figure 7:
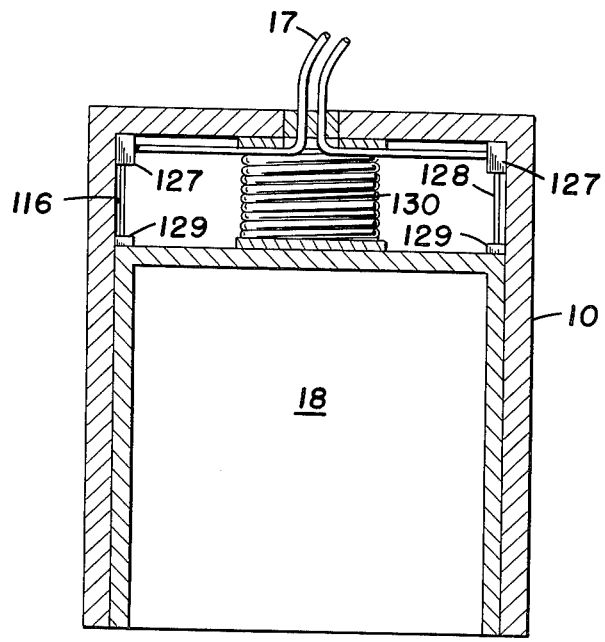
FIG. 7 shows an alternative canister ejection means.

Of course other means known in the art may be used to eject canisters 18. One example, shown in FIG. 7, would be the use of one or more solenoids 127 in place of the explosive cartridge which would be activated by the output pulses to release via connecting rods 128 latches 129 securing the canister 18 within the compartment 116 against the force of a compressed spring 130 bearing against the upper surface of the compartment and the top of the canister. Alternately, the solenoid-controlled latches may release a hinged door panel pivoted to the lower edge of the compartment and holding the canister against the spring. Known methods utilizing ram-air pressure instead of the compressed spring may also be used.

FIG. 8 shows an embodiment of the canister sequencer 92 which controls the release of the individual canisters 18 from the dispenser 10. The canister release signal from the dispenser selector 90 is fed into a pulse amplifier 131, together with the release power from the pilot's firing control switch. The amplified signal is then fed into the rotary solenoid stepping switch 132 comprising the rotary solenoid 134 and the decks 136–142 of the switch. The rotary solenoid 134 mechanically converts the linear action of a solenoid to a rotary motion of the shaft 135. Suitably mounted on shaft 135 for rotary movement therewith are the plurality of decks 136, 138 140 and 142. As an illustrative example only, FIG. 8 shows four canisters to be ejected from the dispenser. Of course more or less numbers of canisters may be used with the corresponding number of poles in the switch. Power from the pilot's firing control switch is fed into deck 136 of the switch while munition arming power from the aircraft electrical power supply is fed to deck 140. Intermediate decks 138 and 142 serve as additional safety features by shorting out all of the canister leads except the one to be fired.

The operation of the constant-density dispensing system is apparent from the foregoing description. Canister release pulses are produces via the fluidic generator 14, transducer 53, rectifier section 86, and oscillator 88 and routed by selector 90 after the aircraft attains a speed higher than the design threshold speed of the generator 14. These pulses, with frequency linearly proportional to airspeed, are amplified in the amplifier 131 and introduced to the rotary solenoid 134. Arming power to the munition is turned on as the aircraft nears the target site. Power from the pilots firing control serves two purposes: one, to provide the necessary energy to activate the igniters 126 in the canisters; and two, to gate or control the release signal from the selector 90. Since the canister release signals are continually being generated and introduced to amplifier 131 as long as the aircraft speed is greater than the threshold speed, amplifier 131 is activated only when the pilot depresses the firing switch to complete the firing circuit to the igniters. As long as the firing switch is closed, each pulse will cause solenoid 134 to turn the switch 132 once, completing the canister release circuit and the munition arming circuit in sucession. The rotary solenoid stepping switch provides a mechanical "memory" in the firing system such that if munitions deployment is stopped and restarted, the sequencer 92 will "remember" which canister was last fired and upon activation of the dispensing system the sequencer automatically fires and ejects the next canister. Where an explosive cartridge 124 is used, the firing pulses ignite the firing squib 126 which is turn detonates the cartridge 124, forcing canister 18 downwardly, shearing strip 118 and ejecting canister 18 below the dispenser 10. When solenoids 127 are used, the firing pulses energize the solenoid to release latches 129, permitting the compressed spring 130 to expell the canister from the dispenser. At higher speeds, the frequency of the firing pulses are increased to eject the canisters more rapidly, and conversely at lower speeds to maintain a fixed ground spacing of the deployed munitions. The desired spacing is controlled by proper adjustment of potentiometers 96 and 102 in the oscillator 88.

It can be seen that the disclosed munitions dispensing system provides several, redundant safety features. Since the fluidic generator 14 commences operation only after the aircraft attains a threshold speed, the munition canisters cannot be ejected at low speeds, such as during takeoff and landing or when the aircraft is on the ground, even if the arming power is accidently turned on and the firing switch is inadvertently depressed. Above the threshold speed, munitions deployment is controlled by the pilot via the firing switch and the separate control of the munitions arming permits the pilot to eject harmless, unarmed bombs, bomblets, or other munitions when off-loading of weapons becomes necessary.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. An aircraft munitions dispensing system adapted for ejecting munitions at selectable intervals maintained independently of aircraft speed comprising:
   a dispenser adapted to be attached to the aircraft;
   a plurality of munition containers positioned in said dispenser;
   a velocity-discriminating, air-driven generator positioned in said dispenser for producing an a.c. voltage proportional to aircraft speed;
   a firing control system connected to said generator including:
      an electronic package responsive to said generator for producing a series of pulses with frequency proportional to aircraft speed comprising:
         a rectifier circuit connected to said generator for converting the a.c. voltage to a d.c. voltage proportional to aircraft speed; and
         a voltage-controlled oscillator circuit connected to said rectifier circuit for producing output pulses with frequency proportional to aircraft speed; and
      pulse distribution means to control ejection of the individual munition containers; and ejection means positioned adjacent said munition containers responsive to said firing control system for forcibly ejecting said containers from said dispenser package.

2. The munitions dispensing system of claim 1 wherein said electronic package further comprises potentiometer means to adjust the frequency of said output pulses.

3. The munitions dispensing system of claim 2 wherein said ejection means comprises:
 at least one igniter squib responsive to the output pulses of said electronic package; and
 at least one explosive cartridge responsive to said igniter squib,
 whereby upon ignition by said squib said explosive cartridge forcibly expels said container from said dispenser.

4. The munitions dispensing system of claim 2 wherein said ejection means comprises:
 at least one solenoid responsive to the output pulses of said electronic package;
 spring means positioned between said dispenser and said munition container to apply an expulsion force to said container; and
 latch means operatively connected to said solenoid for securing said container with said dispenser;
 whereby said solenoid is activated by the output pulses to release said latch means permitting said spring means to eject said container.

5. The munitions dispensing system of claim 2 wherein said airdriven generator is responsive to air flow velocities greater than a predetermined minimum velocity and comprises:
 a plurality of chambers adated to filter and dry the air flow;
 a resonant cavity in fluid communication with said chambers;
 a resilient diaphrapm positioned within the closing one end of said cavity for vibrational movement in response to resonance of the airstream in said cavity; and
 transducer means operatively coupled to said diaphragm for generating an a.c. voltage in response to the vibration movement of the said diaphragm;

6. The munitions dispensing system of claim 5 wherein said transducer means comprises:
 a pair of opposed permanent magnets supported adjacent said diaphragm;
 a coil positioned between said magnets; and
 a ferromagnetic reed extending between said magnets having one end coupled to said diaphragm,
 whereby vibration of said diaphragm causes said reed to oscillate between said magnets to induce an a.c. voltage in said coil.

7. The munitions dispensing system of claim 5 wherein said pulse distribution means comprises:
 a rotary solenoid responsive to the output pulses of said electronics package; and
 switch means operatively coupled to said solenoid for sequentially completing the firing circuit for the container ejection means.

8. The munitions dispensing system of claim 7 wherein said switch means further includes means to complete the arming circuit for said munition containers.

9. The munitions dispensing system of claim 8 wherein said ejection means comprises:
 at least one igniter squib responsive to the output pulses of said electronic package; and
 at least one explosive cartridge responsive to said igniter squib,
 whereby said cartridge is ignited by said squib to forcibly expel said container from said dispenser.

10. The munitions dispensing system of claim 8 wherein said ejection means comprises:
 at least one solenoid responsive to the output pulses of said electronics package;
 spring means positioned between said dispenser and said munition container to apply an explusion force to said container; and
 latch means operatively connected to said solenoid for securing said container within said dispenser,
 whereby upon activation said solenoid releases said latch means to permit said spring means to eject said container.

11. The munitions dispensing system of claim 3 wherein said airdirven generator is positioned in the forward portion of said dispenser and the aft portion of said dispenser is provides with a substantially open bottom portion, said munition containers being secured within said dispenser by shearable attachment means.

12. The munitions system of claim 4 wherein said dispenser is provided with a substantially open bottom portion, said munition containers being secured with said dispenser by shearable attachment means.

* * * * *